United States Patent
Larson et al.

(10) Patent No.: US 7,133,785 B2
(45) Date of Patent: Nov. 7, 2006

(54) VALVE CONTROL SYSTEM AND METHOD

(75) Inventors: Dwight S. Larson, Austin, TX (US);
Kenneth E. Tinsley, Frisco, TX (US);
Faisal Tariq, Allen, TX (US)

(73) Assignee: Celerity, Inc., Austin, TX (US)

( * ) Notice: Subject to any disclaimer, the term of this patent is extended or adjusted under 35 U.S.C. 154(b) by 24 days.

(21) Appl. No.: 10/887,040

(22) Filed: Jul. 8, 2004

(65) Prior Publication Data
US 2006/0009925 A1    Jan. 12, 2006

(51) Int. Cl.
*G06F 19/00*  (2006.01)
*G05D 7/00*  (2006.01)

(52) U.S. Cl. .................. 702/45; 702/100; 700/282
(58) Field of Classification Search ............... 702/45, 702/100
See application file for complete search history.

(56) References Cited

U.S. PATENT DOCUMENTS

| | | | |
|---|---|---|---|
| 4,103,695 A * | 8/1978 | Aono | 137/1 |
| 4,586,126 A | 4/1986 | Funk et al. | |
| 4,949,288 A * | 8/1990 | Bookout | 702/140 |
| 5,202,813 A * | 4/1993 | Uota et al. | 361/154 |
| 5,329,462 A * | 7/1994 | Friday et al. | 700/282 |
| 6,272,401 B1 * | 8/2001 | Boger et al. | 700/282 |
| 6,285,922 B1 | 9/2001 | Bloss | |
| 6,550,368 B1 | 4/2003 | Leeman et al. | |
| 6,609,071 B1 | 8/2003 | Shapiro et al. | |
| 2001/0034567 A1 | 10/2001 | Allen et al. | |

OTHER PUBLICATIONS

International Search Report and Written Opinion for related International Application No. PCT/US05/24033, filed Dec. 22, 2005.

* cited by examiner

*Primary Examiner*—Bryan Bui
*Assistant Examiner*—Jonathan Moffat
(74) *Attorney, Agent, or Firm*—Lowrie, Lando & Anastasi, LLP (57) ABSTRACT

Embodiments of the present invention provide a system and method of valve control that eliminates, or at least substantially reduces, the shortcomings of prior art valve control systems and methods. More particularly, embodiments of the present invention provide systems and methods for multi-channel valve control. One embodiment of the present invention includes a system of valve control that comprises a processor, a computer readable medium accessible by the processor and a set of computer instructions that are executable by the processor to output a first signal on a first channel indicating an initial force to be applied to a valve by an actuator and output a second signal on a second channel indicating a control force to be applied to the valve.

30 Claims, 8 Drawing Sheets

FIGURE 1

Prior Art

FIGURE 2

Prior Art

FIGURE 3

Prior Art

VALVE CONTROL SYSTEM AND METHOD

TECHNICAL FIELD OF THE INVENTION

Embodiments of the present invention relate to the field of flow control. More particularly, embodiments of the present invention relate to systems and methods for multiple channel flow control.

BACKGROUND OF THE INVENTION

Figure 1:
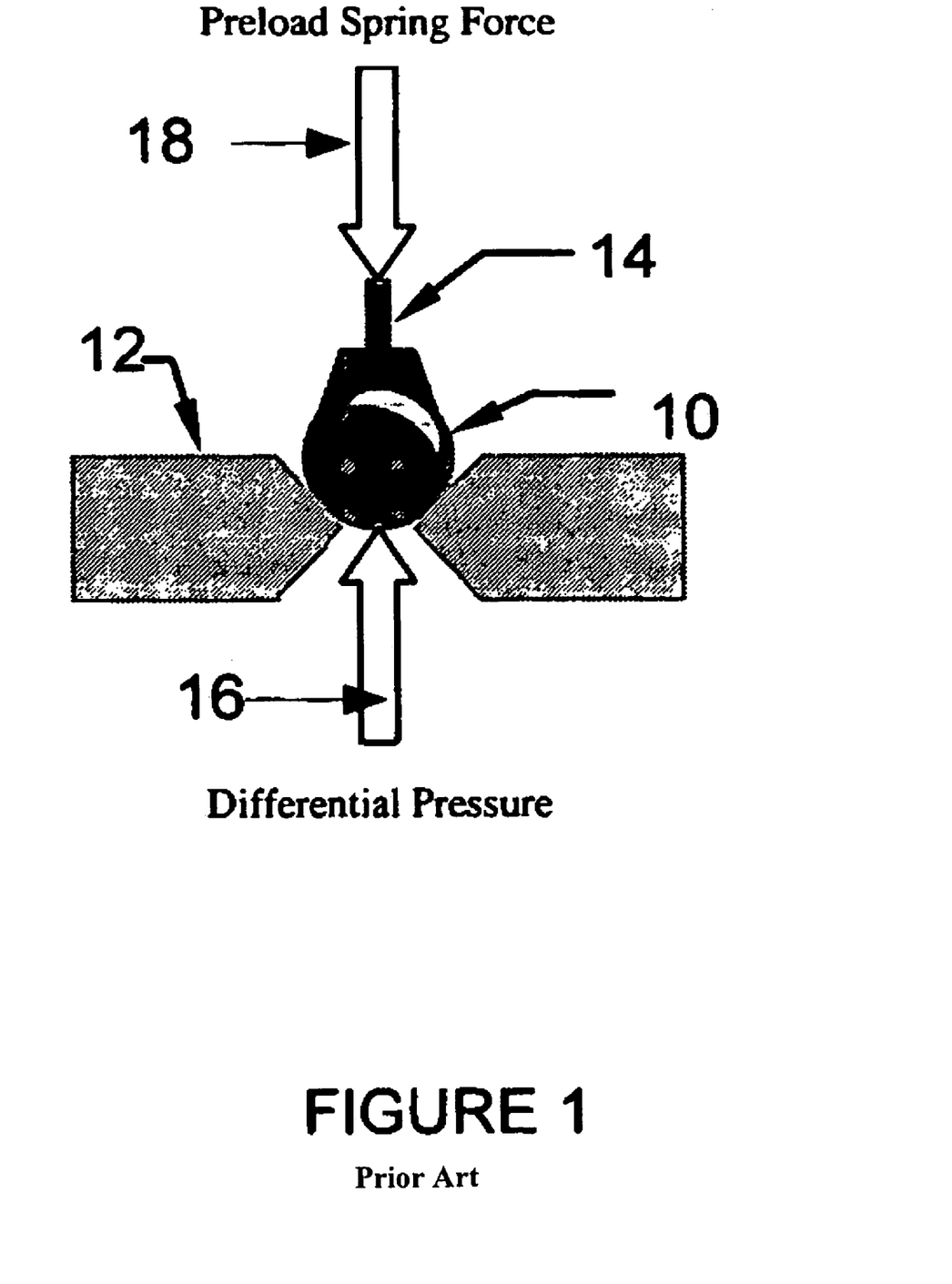
FIG. 1 is a diagrammatic representation of a globe valve.

Many thermal mass flow controllers utilize force-actuated "globe" valves to control gas flow through the controllers. A globe valve, as shown in FIG. 1, typically comprises a spherical poppet 10 that seals against a circular or conical valve seat 12. A variable force actuator connected to a valve stem 14 can exert a force to unseat poppet 10 from valve seat 12. A valve, such as that depicted in FIG. 1, can be designed such that the differential pressure force 16 of the fluid being controlled either acts to seal the valve or unseat the valve. In the example of FIG. 1, the differential pressure force 16 acts to unseat the valve. To counteract this force, a preload spring can exert a spring force 18 on the poppet to keep the valve closed in the absence of an actuating force. This preload force is generally set high enough to prevent flow at the highest anticipated inlet pressure.

In many mass flow controllers, the initial application of force by the actuator does not result in appreciable flow, as the valve is held closed by the preload spring force. When the actuating force is approximately equal to the spring force minus the force caused by the differential pressure, the poppet opens and fluid begins to flow. As further actuating force is applied to the valve stem, the poppet is further removed from the valve seat and the flow orifice is enlarged. This causes increased flow through the valve.

Figure 2:
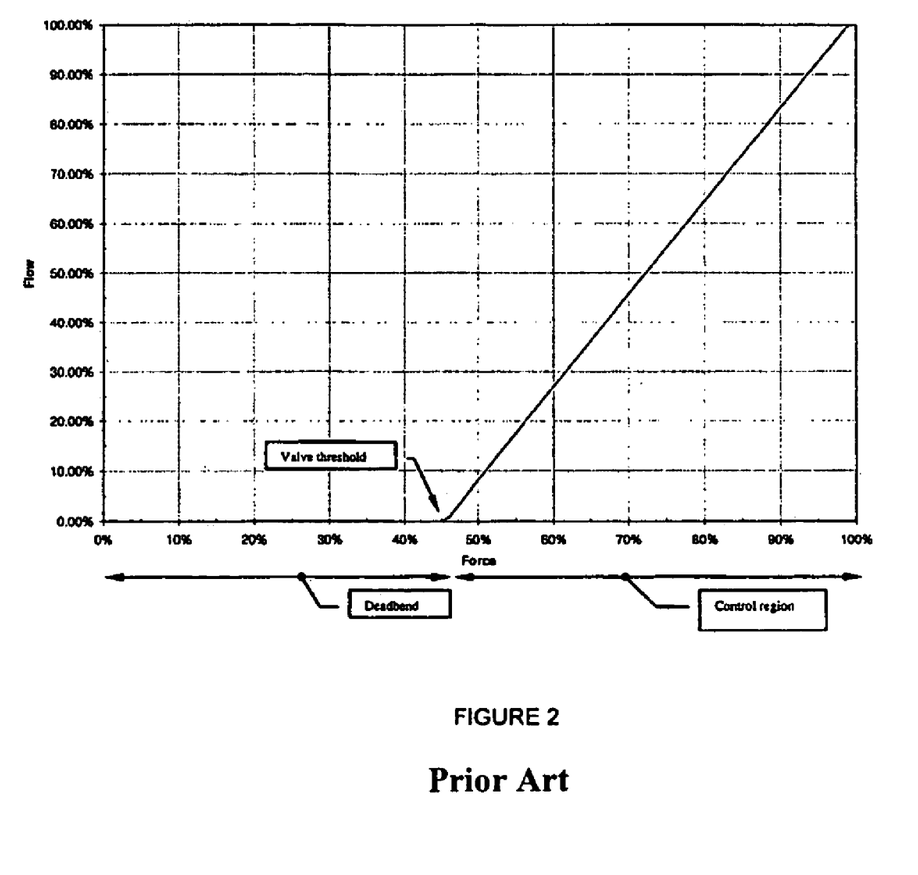
FIG. 2 is a force/flow chart for a valve.

FIG. 2 illustrates an example flow/force curve for a valve. The region of the force flow/force curve where no flow occurs is referred to as a deadband. The width of the deadband region is proportional to the preload closing force and the opening force exerted on the poppet by the differential pressure force. The region where flow does occur is the useful control region. The point at which leakage begins to occur and the valve begins to open is referred to as the valve threshold. Flow in the control region is typically proportional to the valve displacement caused by the actuating force acting against the preload spring, valve seat/poppet diameter, and differential pressure. While control region of FIG. 2 is shown as generally linear, the control region can be non linear and suffer from mechanical hysteresis.

Several factors (both dynamic and static) can alter the threshold and gain (i.e., slope of flow/force curve the control region) of the valve. For instance, a change in preload will alter the valve threshold without affecting gain in the control region. A change in valve diameter, on the other hand, will affect the gain with relatively little change in the threshold. This is because the same linear displacement of a larger valve poppet results in greater flow through the valve at the same differential pressure. Similarly, a change in differential pressure will affect gain, with increased differential pressure leading to a larger gain.

Figure 3:
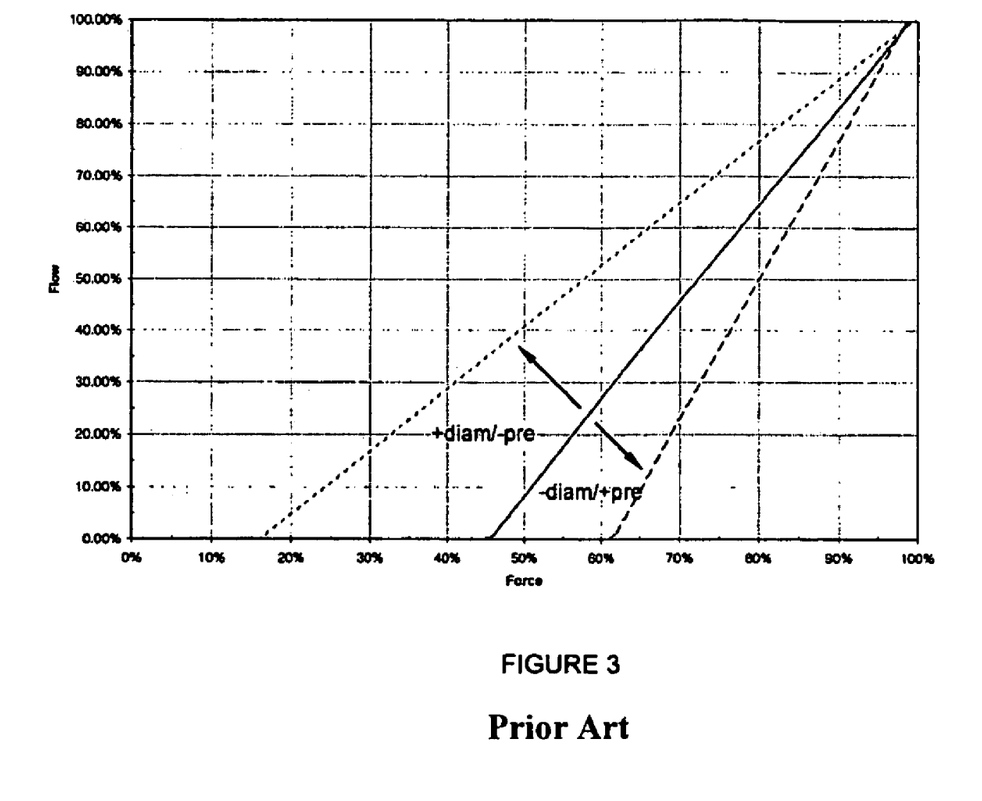
FIG. 3 is a force/flow chart illustrating the effects of changes in valve diameter or differential pressure.

FIG. 3 shows three example flow/force curves for three combinations of valve diameters and preload settings. Each of the three response curves is able to reach a one hundred percent flow rate, despite the variance in valve diameter and corresponding preload setting. However, the valves display different threshold levels and gains within their control regions. When the valve diameter is larger or differential pressure anticipated is higher, the valve preload is increased to prevent leak-through. Likewise, when the valve diameter is smaller or the anticipated differential pressure is lower, the preload can be decreased. This compensates for the lower gain of the smaller valve or lower pressure to ensure that the valve can reach an adequate maximum flow rate. In prior art systems, each mass flow controller is individually tuned to compensate for changes in threshold and gain.

Prior art mass flow controller valve systems utilized a single control system output channel to set the opening force applied to the valve stem. When a non-zero mass flow set point is received, the control system begins to increase the output value until flow is established and eventually equals the set point value. The time required to increase the valve force beyond the threshold contributes to a slow response time. Additionally, having to account for the transition through the deadband with a single channel can cause the integral term of the typical control algorithm to overshoot the set point.

To counter these effects, some prior art systems apply a pre-charge to the control system output such that valve drive is driven immediately to the threshold of flow any time a non-zero flow set point is asserted. This system is effective in reducing dead time and control system overshoot, but introduces other problems. One such problem is a loss of resolution in the control region. The actuation force applied to a poppet is generally proportional to the number of quantized step asserted by a digital controller via a digital-to-analog conversion system. Applying a fixed initial force to overcome the valve threshold requires that a single-channel system uses some number of the total available steps for the initial force. As an example, if a single channel control system can adjust the valve opening force in 100 of those steps, the initial force may require 45 of those steps. This leaves only 55 steps to control flow in the control region. As the required threshold force increases, the resolution in the control region decreases as more steps are required for the initial force.

Moreover, the addition of an initial force to reach the valve threshold complicates the control system. Ideally, a control system is most easily implemented when the control output is related to the controlled parameter by a linear function with minimum offset. The use of threshold force, however, introduces a significant offset. The value of the offset can vary greatly based on static and dynamic factors such as valve diameter and differential pressure, making it difficult to calibrate mass flow controllers that apply an initial force through the same channel as the control force.

SUMMARY OF THE INVENTION

Embodiments of the present invention provide a system and method of valve control that eliminates, or at least substantially reduces, the shortcomings of prior art valve control systems and methods. More particularly, embodiments of the present invention provide systems and methods for multi-channel valve control.

One embodiment of the present invention includes a system of valve control that comprises a processor, a computer readable medium accessible by the processor and a set of computer instructions that are executable by the processor to output a first signal on a first channel indicating an initial force to be applied to a valve by an actuator and output a second signal on a second channel indicating a control force to be applied to the valve.

Another embodiment of the present invention includes a method for controlling a valve that includes outputting a first signal on a first control channel indicating an initial force to be applied to the valve, outputting a second signal on a second control channel indicating a control force to be applied to the valve, and generating a third signal from the first signal and the second signal, wherein the third signal indicates a valve force equal to the initial force and the control force.

Yet another embodiment of the present invention includes a method for controlling a valve that comprises generating a reference signal with a reference voltage proportional to a total force, generating a first signal having a first voltage based on the reference voltage, wherein the first voltage is proportional to an initial force, generating a second signal having a remainder voltage, generating a second voltage based on the remainder voltage that is proportional to a control force and generating a valve control signal having a third voltage equal to the first voltage and the second voltage.

Yet another embodiment of the present invention includes valve control system that has a processor with a threshold output and a control output, a computer readable medium accessible by the processor and a set of computer instructions that are executable to output a first pulse width modulated signal on the threshold output indicating an initial force to be applied to a valve by an actuator and output a second pulse width modulated signal on the control channel indicating a control force to be applied to the valve. This embodiment can also include a reference voltage source and a first open drain buffer that has: a reference voltage input connected to the reference voltage source, a threshold input connected to the threshold output and a first open drain buffer output. The valve control system can further include a first low pass filter connected to the first open drain buffer output and a first summer having first summer inputs connected to the first low pass filter and the reference voltage source. This embodiment of the present invention can also include a second open drain buffer that has a remainder voltage input connected to a first summer output, a control input connected to the control output and a second open drain buffer output. The control system can still further include a second low pass filter connected to the second open drain buffer output, the second low pass filter having a second low pass filter output and a second summer connected to the second low pass filter output.

Yet another embodiment of the present invention can include a method for controlling a valve that comprises generating a first pulse width modulated signal, with a pulse width proportional to an initial force, generating a second pulse width modulated signal, with a pulse width proportional to a control force, converting the first pulse width modulated signal into a first direct current signal having a first voltage proportional to the initial force based on the first pulse width modulated signal and a reference voltage, generating a remainder voltage, converting the second pulse width modulated signal into a second direct current signal having a second voltage proportional to the control force based on the second pulse width modulated signal and the remainder voltage and summing the first direct current signal and the second direct current signal to generate a valve control signal.

Another embodiment of the present invention can include valve control system that has a processor with a threshold output a control output, a computer readable medium accessible by the processor and a set of computer instructions stored on the computer readable medium that are executable to output a first signal on the threshold output indicating an initial force to be applied to a valve by an actuator and output a second signal on the control channel indicating a control force to be applied to the valve. The control system can further include a reference voltage source, a first digital to analog converter connected to the threshold output and the reference voltage source and a first summer connected to an output of the first digital to analog converter and the reference voltage source that generates a remainder voltage. The control system can still further include a second digital to analog converter connected to the control output and the first summer. The control system can further include a second summer connected to outputs of the first digital to analog converter and the second digital to analog converter.

Yet another embodiment of present invention can include a method for controlling a valve comprising 31. A method for controlling a valve comprising generating a digital signal indicating an initial force, generating a second digital signal indicating a control force, converting the first digital signal at first digital to analog converter into a first direct current signal having a first voltage proportional to the initial force based on the first digital signal and a reference voltage, generating a remainder voltage, converting the second digital signal at a second digital to analog converter into a second direct current signal having a second voltage proportional to the control force based on the second digital signal and the remainder voltage and summing the first direct current signal and the second direct current signal to generate a valve control signal.

BRIEF DESCRIPTIONS OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Embodiments of the present invention provide a system and method for multi-channel valve control. More particularly, embodiments of the present invention provide a system and method of dual-channel valve drive in a mass flow controller.

For purposes of this invention, the term "total force" refers to the force required to achieve 100% flow for a particular valve configuration, "initial force" refers to a baseline force applied to the valve over the initial portion of the force/flow curve for the valve, the remainder force is the difference between the total force and the initial force, the term "control force" indicates a force applied in addition to the initial force and the term "valve force" indicates the amount of force applied to the valve.

Embodiments of the present invention provide a valve control system in which the initial force can be indicated on a first channel and the control force can be indicated on another channel. The outputs of the two channels can be combined to determine the valve force. By splitting control of the initial force and control force between multiple channels, the control system can have increased resolution controlling the control force and can react more easily to dynamic conditions (e.g., changes in pressure) that affect the force/flow curve for the valve.

Figure 4:
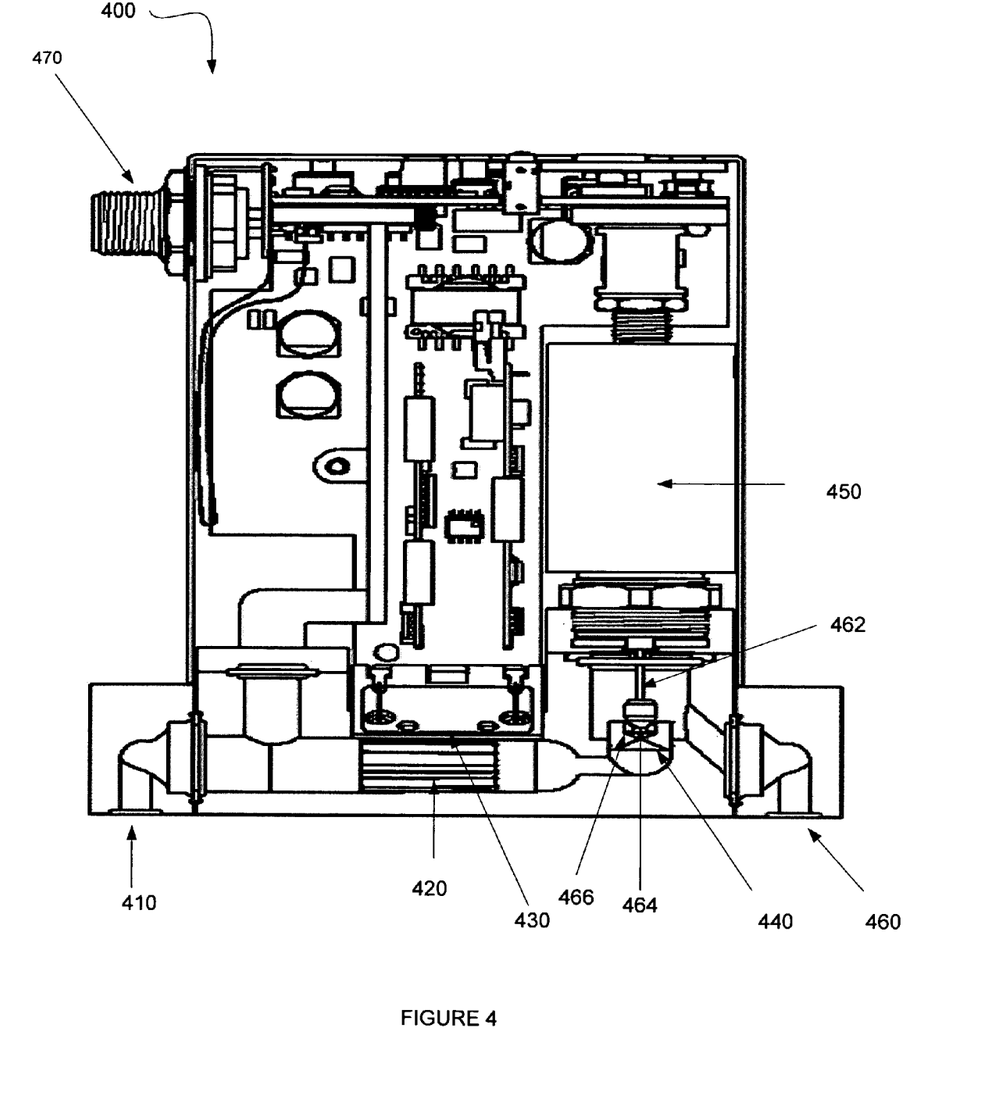
FIG. 4 is diagrammatic representation of a flow control device.

FIG. 4 is a diagrammatic representation of one embodiment of a flow controller. Mass flow controller 400 comprises inlet fitting 410, flow restrictor 420 thermal mass flow sensor 430, control valve 440, solenoid 450, outlet fitting 460 and I/O coupling 470 for communicating with a control system or process management system. Thermal mass flow sensor 430, which can include upstream and downstream resistors and solenoid 450 may be coupled to an embedded control system. The control valve is driven by a current controlled solenoid valve drive circuit.

Fluid (e.g., gas, liquid, gas-vapor mix) enters mass flow controller 400 through inlet fitting 410, flows through flow restrictor 420, control valve 440 and outlet fitting 460. The volume of gas flowing through outlet fitting 460 is controlled by control valve 440, which is in turn controlled by solenoid 450. The embedded control system monitors the set point input and flow sensor output. A control algorithm, such as a closed loop control algorithm executed by the embedded control system operates to output a valve control signal to solenoid 450. In response to the valve control signal, solenoid 450 exerts a force on valve stem 462 to move poppet 464 away from valve seat 466. The amount of force the solenoid must exert to allow a particular flow through control valve 440 can be based on a preload force exerted by a preload spring, a force exerted by the diaphragm and the differential pressure force. The mass flow controller of FIG. 4 is provided by way of example only, and embodiments of the present invention can be implemented in a variety of mass flow controllers including those described in U.S. patent application Ser. No. 10/886,836, entitled "Method and System for a Mass Flow Controller with Reduced Pressure Sensitivity", filed Jul. 8, 2004, by Tinsley et al., which is hereby fully incorporated by reference herein, (the "Reduced Pressure Sensitivity Application").

Figure 5:
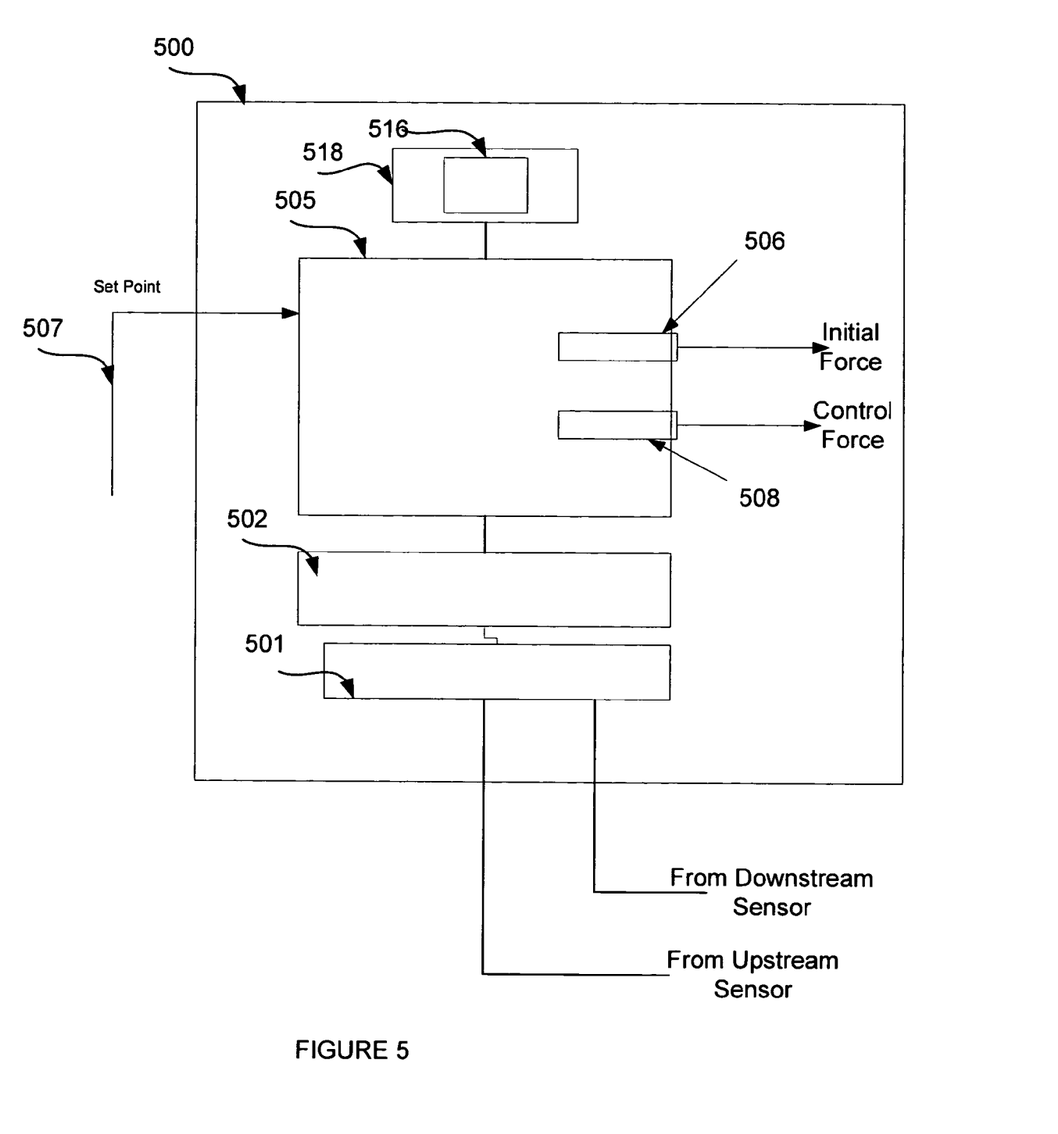
FIG. 5 is a diagrammatic representation of one embodiment of a control system.

FIG. 5 is a diagrammatic representation of one embodiment of a control system 500 according to one embodiment of the present invention. Control system 500 can include sensor logic to output a sensed flow based on the resistances of the upstream and downstream sense elements (e.g., resistors). The sensor logic 501 can include sensor logic such as the interface logic of U.S. Pat. No. 6,575,027, entitled "Mass Flow Sensor Interface Circuit", issued Jun. 10, 2003 to Larson et al., which is hereby fully incorporated by reference herein. Processor 505 (e.g., CPU, ASIC, or other processor known in the art) can be connected to sensor logic 501 by an analog to digital ("A/D") converter 502. A/D converter 502 can receive the sensed flow signal from sensor logic 501 and convert the received signal to a digital representation of the sensed flow. Processor 505 can receive the sensed flow from A/D converter 502. Based on a digital or analog set point 507 applied to controller 500, and the sensed flow, processor 505 can generate a digital control signal that represents how much a valve should open or close to regulate fluid flow. In generating the control signal, controller 500 can also account for the attitude of the thermal mass flow sensor (e.g., thermal mass flow sensor 430), as described in U.S. patent application Ser. No. 10/887,048 entitled "Attitude Insensitive Flow Device System and Method", filed Jul. 8, 2004, by Dwight Larson, which is hereby fully incorporated by reference herein.

According to one embodiment, the present invention can utilize multiple channels to regulate how much the valve should open or close. The output of the first channel 506 can indicate an initial force to be applied by, for example, a solenoid. The output of the second channel 508 can indicate the additional, or control force, that should be applied to the valve to open the valve to produce a desired flow. According to one embodiment of the present invention, the control force can be represented as a portion of the remaining force.

As an example, if the total force required to open a valve for 100% flow is considered 100% force, first channel 506 can output a signal to indicate that the actuator should apply, for example, 44% force. According to one embodiment the present invention, the force indicated by first channel 506 can be approximately the valve threshold force. Second channel 508 can output a signal to indicate the percentage of the remaining force (e.g., the remaining 56% force) that the actuator should apply. For example, second channel 508 can indicate that the actuator should apply 50% of the remaining force. The outputs of the first channel and second channel can be combined to indicate the valve force to be applied by the actuator. Continuing with the foregoing example, the output of the first channel and the second channel can be combined to indicate that the actuator should apply 72% of the total force (e.g., 44% of the total force as the initial force plus 50% of the remaining force as the control force) to the valve. The output of the channels can be combined, according to one embodiment of the present invention, using additional logic as shown, for example, in FIG. 6 and FIG. 7.

If the output of first channel 506 indicates a force to be applied at or near the valve threshold force, the full resolution of second channel 508 can be used for the control region of the valve. Returning to the previous example, if the valve threshold force is approximately 44% of the force required to open the valve to achieve 100% flow, and the output of first channel 506 is configured to indicate a force to be applied by the actuator of approximately 44% the total force, the remaining 56% of the total force is the force used for actually opening the valve rather than overcoming the preload. The amount of this remaining 56% used is dictated by the output of second channel 508.

It should be noted that first channel 506 and second channel 508 can indicate the respective forces to be applied according to any digital or analog scheme known in the art. For example, each channel can output a digital representation of the force to be applied or can output a voltage that is to the force to be applied for each channel. According to one embodiment of the present invention, the output of each control channel can be a pulse width modulated ("PWM") signal. As would be understood by those of ordinary skill in the art, a PWM signal has a preset frequency. In each period (P), referred to as a duty cycle, the pin outputting the signal can be set high for a time $t_1$ and low for a time $t_2$ that is equal to P minus $t_1$. The time $t_1$ can range from 0%–100% of the duty cycle in preset increments. For example, a PWM output may have a frequency of 100 MHz and $t_1$ can range from 0–10 μs in increments of 0.1 μs. In this case, the PWM signal has 100 steps per duty cycle.

According to one embodiment of the present invention, the output of the first channel can output a PWM signal with a pulse width proportional to the initial force relative to the total force. For example, if the initial force is 44% of the total force, the PWM signal will be high for 44% of the steps in a duty cycle. For second channel 508, the PWM signal will be high for the portion of the duty cycle proportional to the amount of the remaining force to be applied (i.e., proportional to the amount of the total force minus the initial force to be applied). If, for example, second channel 508 indicates that 50% of the remaining force is to be applied, the PWM signal from second channel 508 can be set to high for half the duty cycle.

Processor 505 can generate signals on the first channel and the second channel by executing a software program that can include a control algorithm, stored as a set of computer instructions 516 on a computer readable medium 518 (e.g., EEPROM, RAM, ROM, flash memory, magnetic storage, optical storage or other computer readable memory known in the art), accessible by processor 505. In one embodiment of the present invention, controller 500 can be calibrated such that processor 505 outputs a threshold signal on the first channel to indicate that the initial force to be applied is approximately the threshold force. Processor 505 can, according to one mode of operation, output the threshold signal whenever a set point signal is applied to controller 500.

The control algorithm can calculate the digital control signal output on second channel 508 using any control scheme known in the art, including, but not limited to, a PID, a modified PID with offset or other control algorithm known in the art. The control algorithm determines how far the valve should open based, for example, on calibration curves for the valve, gas flowing through the valve and the set point applied. Assuming the first channel indicates an initial force that is approximately the valve threshold force, the amount the valve should open, from a range of fully closed to fully open, is generally proportional to the amount of the remainder force applied by the proportional actuator. Therefore, processor 505 can indicate how far the valve should open by indicating the amount of remaining force that should be applied to the valve, assuming the first channel is indicating that the initial force to be applied is approximately the threshold force. For example, if the valve is to open 50%, processor 505, in response to the control algorithm determining that the valve should open 50%, can indicate on second channel 508 that 50% of remaining force should be applied. The initial force specified by the first channel and the additional force specified by the second channel can be combined to determine the valve force that should be applied to the valve.

Controller 500 can include additional input/output capabilities. For example, controller 500 can include a serial interface to support administrative functions such as updating computer instructions 516. Additionally, controller 500 can include network interfaces to communicate with other flow control devices, administrative computers or other device capable of communicating over a network.

Figure 6:
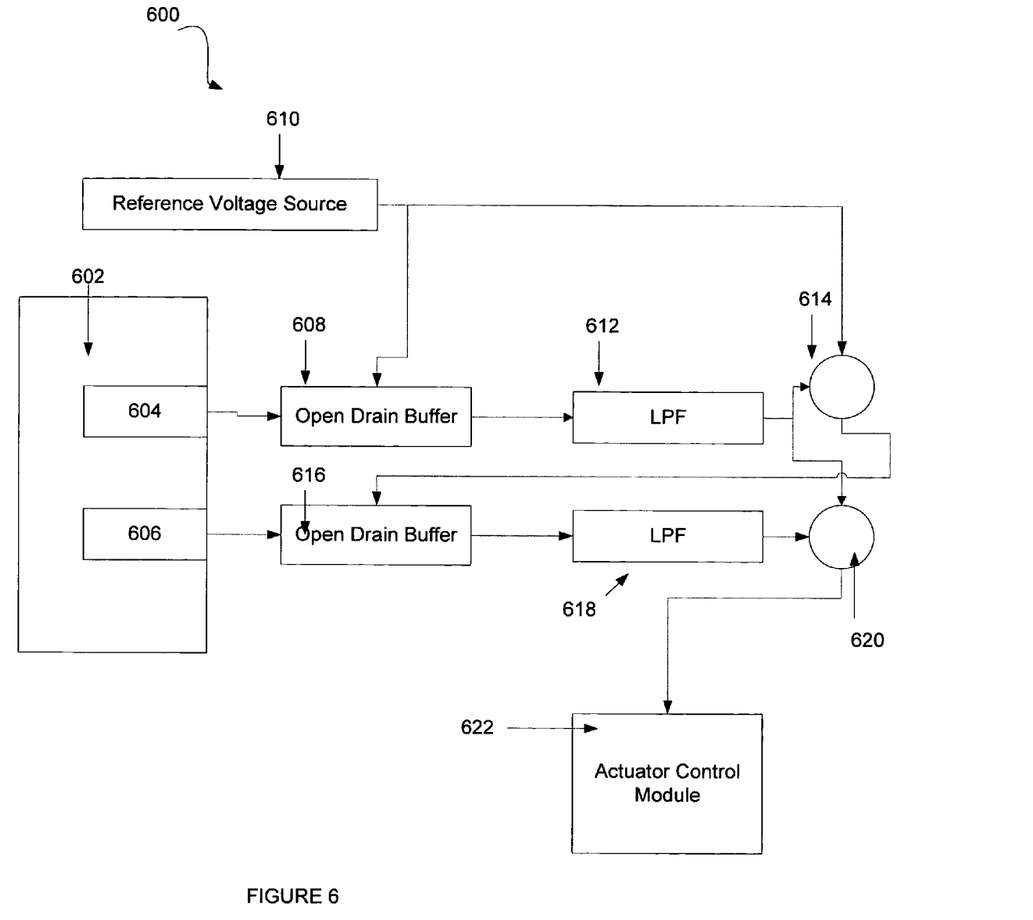
FIG. 6 is a diagrammatic representation of another embodiment of a control system.

FIG. 6 is a diagrammatic representation of a controller system 600 that includes additional logic for combining channels. Control system 600 can include a processor 602 (a microcontroller, a digital signal processor, an ASIC or other processor known in the art) that can execute computer instructions stored on a computer readable medium to implement any control algorithm known in the art. According to one embodiment of the present invention, processor 602 can include at least two outputs, a first output 604 (the threshold output 604) and a second output 606 (the control output 606). Each output can be a PWM output that can output a signal having a particular pulse width per duty cycle. By way of example, but not limitation, each of threshold output 604 and control output 606 can output a signal with 16,000 steps per duty cycle, with a Page: 18 fundamental frequency of 2 kHz, or 500 μs period. The step size is 31.25 ns (16000 steps possible in 500 μs). The DSP may be a Texas Instruments TMS320LF2407A, the open drain buffer a dual-package Fairchild Semiconductor NC7WZ07P6X, the low-pass filter a Sallen-Key topology active second-order filter with $f_c$=100 Hz, and the op-amp a Linear Technology LT1057S8.

In other embodiments of the present invention, threshold output 604 and control output 606 can output a different number of steps per duty cycle and a different number of steps per duty cycle than each other.

Threshold output 604 can be connected to an open drain buffer 608 that is also connected to a reference voltage source 610. Open drain buffer 608 essentially squares the PWM signal to the reference voltage ($V_{ref}$). In other words, open drain buffer 608 gives the pulses of the PWM signal output at threshold output 604 a particular height such that the PWM signal output from open drain buffer 608 has both a regulated time width and peak voltage. The time integral of the PWM signal for one duty cycle (i.e., the area under a pulse if the pulse is charted) is proportional to the initial force. The output of open drain buffer 608 is connected to a low pass filter 612 that rectifies the PWM signal to create a DC output with a voltage proportional to the width of the PWM signal. If the width of a PWM pulse is represented as a percentage of the total available steps ($P_t$), the output voltage of low pass filter, which is also proportional to the initial force, is approximately:

$$T = V_{ref} P_t \quad \text{[EQN. 1]}$$

T=output of low pass filter
$V_{ref}$=reference voltage
$P_t$=pulse width of threshold signal as percentage of available pulse width The output of low pass filter 612 can be connected to a summer 614 that is also connected to reference voltage source 610. Summer 614 subtracts the output T of low pass filter 612 from the reference voltage to give a remainder voltage of approximately:

$$V_{remainder} = V_{ref} - T \quad \text{[EQN. 2]}$$

The remainder voltage, according to one embodiment of the present invention, is proportional to the remainder force. The output of low pass filter 612 can also be connected to summer 620, described below.

Control output 606 can be connected to a second open drain buffer 616, which can also be connected to the output of summer 614. Open drain buffer 616 squares the control PWM signal to the remainder voltage provided by summer 614. The output of open drain buffer 616 can connected to a low pass filter 618. Low pass filter 618 rectifies the output signal of open drain buffer 616. The output of low pass filter 618 is a DC signal with a voltage (C) proportional to the pulse width of the PWM signal output on control output signal 606, approximately according to:

$$C = (V_{remainder}) P_c \quad \text{[EQN. 3]}$$

C=output of low pass filter
$P_c$=pulse width of control signal as percentage of available pulse width The output of low pass filter 618 is connected to summer 620. Summer 620 adds the output signal of low pass filter 618 to the output of summer 614 to generate a valve control signal having a control voltage ($V_c$) approximately according to the following relationships:

$$V_c = T + C \quad \text{[EQN. 4]}$$

$$V_c = (V_{remainder} * P_c) + (V_{ref} * P_t) $$

$$V_c = ((V_{ref} - P_t * V_{ref}) P_c) + (V_{ref} * P_t) \quad \text{[EQN. 5]}$$

$$V_c = (V_{ref} P_c - P_t V_{ref} P_c + V_{ref} * P_t) \quad \text{[EQN. 6]}$$

$$V_c = V_{ref}(P_c - P_t P_c + P_t) \quad \text{[EQN. 7]}$$

$$V_c = V_{ref}(P_t + P_c(1 - P_t)) \quad \text{[EQN. 8]}$$

The control voltage, according to one embodiment of the present invention, is approximately proportional to the valve force. Summer 620 is connected to a proportional actuator control module 622 that, in the case of a solenoid, is configured to generate a current proportional to the voltage of the valve control signal.

As an example of the control system of FIG. 6 in operation, assume that each of threshold output 604 and control output 606 can output PWM signals having up to 16,000 steps per duty cycle. Further assume that control system 600 has been calibrated for a system having a valve threshold of 44% of the total force. In other words, the solenoid requires 44% of the total force required to open the valve completely to reach the valve threshold. Additionally, in this example, assume that the reference voltage is 2.5 Volts. Threshold output 604 can output a signal that indicates the initial force that should be applied to approximately reach the valve threshold. This can be done, for example, by generating an output proportional to the percentage of the total force required to fully open the valve being controlled. In this case, processor 602 can output 7040 steps per duty cycle, or 44% of the steps available in the duty cycle. Open drain buffer 608 essentially multiplies the reference voltage by $P_t$ (0.44 in this example) to create an output that is passed to low pass filter 612. The output signal of low pass filter 612 is a DC signal having a voltage equal to $P_t$ multiplied by $V_{ref}$ according to EQN 1. In the case in which 7040 steps are output in a duty cycle for $P_t$ and the reference voltage is 2.5 Volts, T equals 1.1 Volts. Summer 614 is configured to subtract T from $V_{ref}$ to generate a $V_{remainder}$ of 1.4 Volts according to EQN 2.

Processor 602 can also output a signal on control output 606 to indicate how much control force should be applied to the valve. If, for example, the valve should be 50% open based on the determination of the control algorithm, and the threshold channel 604 is calibrated to indicate initial force approximately equal to the valve threshold, the percentage of the remaining force (i.e., the total force minus the initial force) applied will approximately equal the percentage the valve should open. If, for example, the valve is to open 50%, processor 602 can output 8,000 steps per duty cycle at control output 606 to indicate that a control force that is 50% of the remainder force should be applied. In this case $P_c$ is equal to 0.5.

Open drain buffer 616 can multiply the signal from control output 606 by the remainder voltage, which is proportional to the remainder force, and pass the resulting signal to low pass filter 618. The output of low pass filter, according to one embodiment, can be a DC signal of 0.7 Volts according to EQN 3. Summer 620 can sum the output signal from low pass filter 618 to the output signal of low pass filter 612 to generate a valve control signal having a control voltage $V_c$ of 1.8 Volts according to EQN 4. Proportional actuator control module 622 can convert the 1.8 volts to a proportional current to cause, for example, the solenoid to open 50%.

In the example above, threshold output 604 and control output 606 indicate the initial force and control force to be applied using a PWM signal with a pulse width proportional to the force to be applied. Each PWM signal is squared to a voltage—the reference voltage in the case of threshold output 604 and the remainder voltage in the case of control output 606. However, it should be noted that processor 602 can indicate the initial and control force to be applied in other manners, including through digital and analog outputs that are processed to produce the appropriate force on the valve. Additionally, it should be noted that because the threshold output 604 in the above example indicates an initial force that is approximately the valve threshold force, the pulse width as percentage of total duty cycle output on control output 606 approximately corresponds to the percentage the valve should open. In other embodiments of the present invention, the initial force indicated by threshold output 604 may be different than the valve threshold.

Additionally, in the above example, the valve threshold does not change and, therefore, the pulse width of PWM signal on threshold output 604 remains stable. According to other embodiments of the present invention, however, the initial force indicated on threshold output 604 can change. For instance, as the pressure experienced by the flow controller changes, the valve threshold can also change. Processor 602 can monitor a pressure sensor to determine which valve threshold should apply and generate a corresponding PWM signal on threshold output 604.

As an example, if the valve threshold in the above example changes from 44% to 30% because the pressure differential has increased, but the set point does not change, the output of low pass filter 612 will be a DC signal with a voltage of 0.75 Volts (0.30*2.5 according to EQN 1). $V_{remainder}$ from summer 614 will be 1.75 Volts. Because, in this example, the set point still dictates that the valve should be open 50%, control output 606 can continue to output the same signal. The output signal of the low pass filter 620 will, in this case, be 0.875 Volts. Consequently, the output of summer 620 will be a valve control signal with a control voltage of 1.625 Volts. Actuator control module 622 can translate this voltage into a current that causes the actuator to apply the appropriate force to the valve. The force required by the actuator to open the valve 50% is less than in the previous example because of the greater pressure differential causing a smaller threshold.

Figure 7:
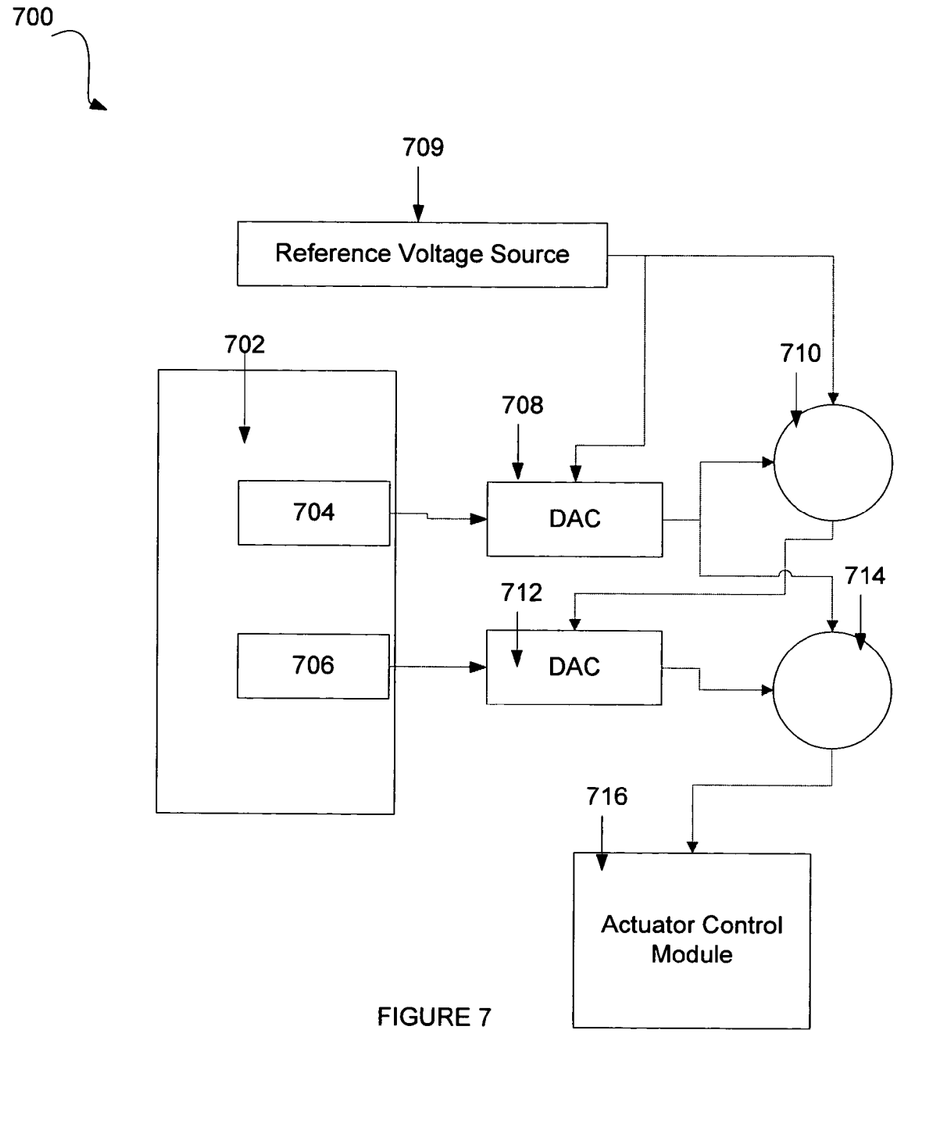
FIG. 7 is a diagrammatic representation of another embodiment of a control system.

FIG. 7 illustrates another embodiment of a control system 700 utilizing multi-channel valve control that includes logic for combining channels. Control system 700 can include a processor 702 (a microcontroller, a digital signal processor, an ASIC or other processor known in the art) that can implement any control algorithm known in the art. According to one embodiment of the present invention, processor 702 can include at least two outputs, a first output 704 (the threshold output 704) and a second output 706 (the control output 706). Each output can be a digital output that indicates, through a digital signal, a force to be applied.

Threshold output 704 can be connected to a first digital to analog converter (DAC 708) that can convert the digital signal to an analog signal having a voltage proportional to the initial force indicated by the digital signal of threshold output 704. For example, if the signal of threshold output 704 indicates that 44% of the total force should be applied as the initial force, the output of DAC 708 can be 44% of a reference voltage provided by reference voltage source 709.

A summer 710 can subtract the output of DAC 708 from the reference voltage to produce a remainder voltage that is proportional to the remainder force.

Control output 706 can be connected to a second DAC 712. DAC 712 can receive the remainder voltage and multiply the signal of control output 706 by the remainder voltage. If, for example, control output 706 indicates that 50% of the remaining force should be applied to the valve, the voltage of the output signal of DAC 710 will be the half the remainder voltage. The output signals of DAC 712 and DAC 708 can be summed at summer 714 to produce a control signal having a control voltage. Actuator control module 716 can process control signal such that the actuator applies a valve force to the valve that is proportional the control voltage of the control signal.

Figure 8:
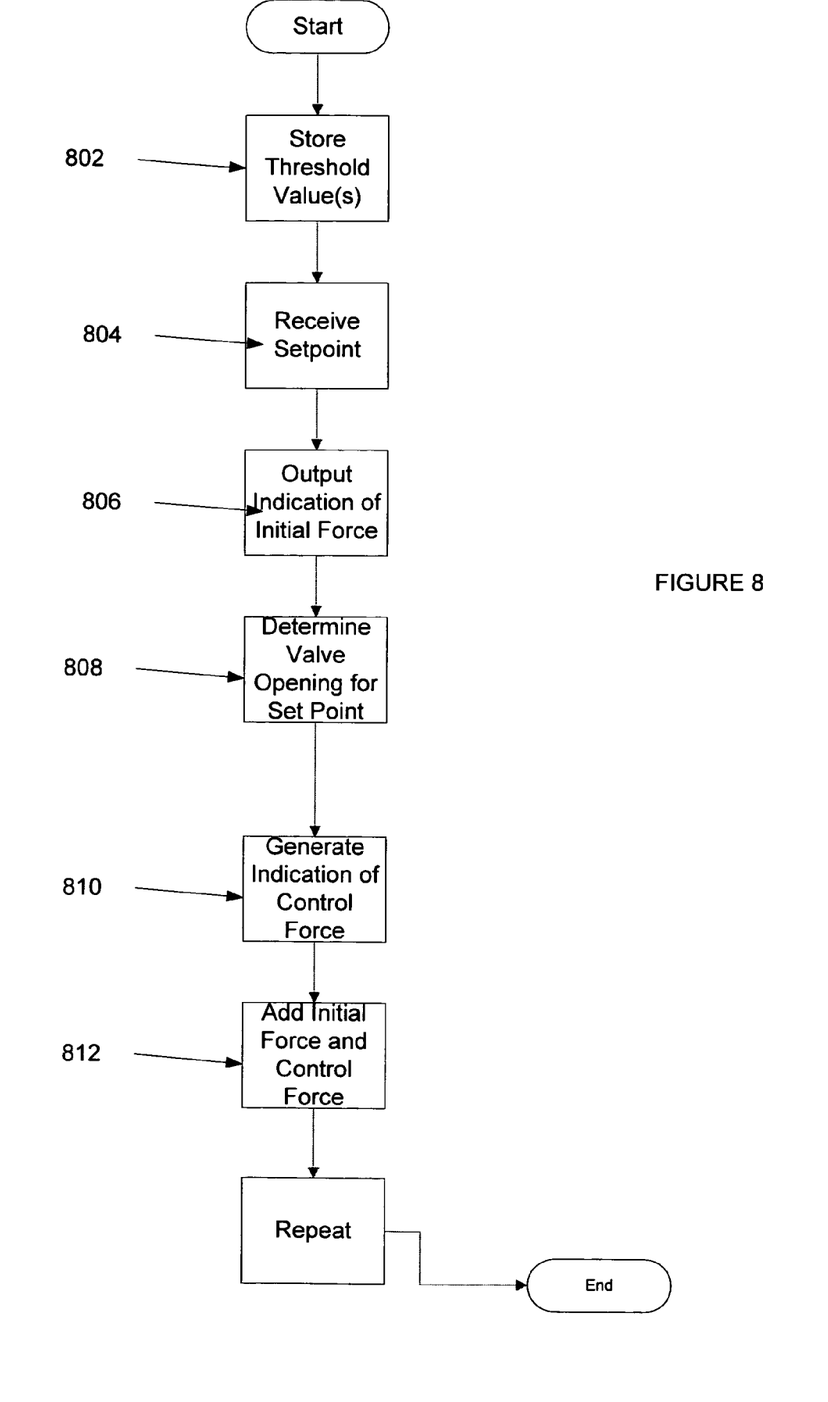
FIG. 8 is a flow chart illustrating one embodiment of a method for controlling a valve.

FIG. 8 is a flow chart illustrating one embodiment of a method for multi-channel control. The process of FIG. 8 can be implemented, for example, as a set of software instructions stored on a computer readable medium (e.g., RAM, ROM, magnetic disk or other computer readable medium known in the art) and executed by a processor of a flow controller and/or hardware programming in the flow controller. At step 802, a valve threshold value or values can be stored. The valve threshold value can be based on a valve configuration and the expected maximum differential pressure that the valve will experience. Because particular solenoid (or other actuator), valve combinations will have approximately the same threshold value for a given differential pressure, threshold values can be determined for a bin of flow controllers that have the same valve/restrictor combination. This allows calibration of the flow controllers to occur on a bin (i.e., valve/restrictor configuration) basis rather than on a controller-by-controller basis. A particular flow controller can be calibrated, for example, by empirically determining the percentage of total force, for example 44% of the total force, required to reach the valve threshold.

The threshold value can be selected such the initial force indicated by the controller is the valve threshold or below the threshold. For example the stored threshold value for the controller can indicate that the initial force should be 43% of the total force. Calibrating the controller such that the initial force is slightly less than the empirically determined valve threshold ensures that leakage will not occur when the initial force is applied. The threshold value determined for a particular controller can be stored in multiple flow controllers having a similar valve restrictor arrangement. Additionally, multiple threshold values can be stored in a controller to account of various maximum differential pressures the flow controller may experience.

The controller at step 804 can receive a set point value. The set point value is typically asserted by a process tool or administrative computer to indicate how much flow the flow controller should allow. At step 806, a first channel can output an initial force based on the stored threshold value. In this case, the initial force indicated can be approximately the valve threshold force. Additionally, at step 808, the controller can determine how far the valve should open to allow the flow dictated by the set point. At step 810, the controller can generate on a second channel a signal that indicates the amount of the remainder force (i.e., the total force minus the initial force) that should be applied. In other words, the controller can indicate over the second channel the amount of control force that should be applied.

At step 812, the controller can generate a signal that indicates a valve force to be applied to the valve. The valve force, according to one embodiment of the present invention, can be equal to the initial force plus the control force. As discussed in conjunction with FIG. 6 and FIG. 7, this can be done, for example, by adding a voltage that is proportional to the initial force to a voltage that is proportional to the control force to generate a control signal with a control voltage proportional to the valve force. The valve control signal can be input to an actuator control that can cause the actuator to apply the appropriate amount of force to the valve. The process of FIG. 8 can be repeated as needed or desired.

Embodiments of the present invention provide advantages over prior art valve control systems and methods as the complicating effects of changing threshold force are largely attenuated. In prior art valve control system, differences in valve diameter could lead to a wide range of gains. This wide range of flow-control gains places a significant demand on a single-channel digital control system tasked with maintaining similar flow control performance from one valve to the next. The range of output gains must be taken into account when setting the overall loop gain for the control system, potentially adversely affecting the stability and response time of a particular mass flow controller.

By contrast, the present invention can utilize one channel to output the threshold force and another channel to output a control force. Regardless of the threshold value and the gain, the control channel has approximately the same number of steps for control in the control region. Using the example above, the control channel will have approximately 16,000 steps to control flow in the control region regardless of the valve threshold and valve gain. Thus, the control channel does not lose resolution as the threshold value increases.

The two-channel method can effectively eliminate the characteristic differences between valve configurations. More particularly, because the control channel has approximately the same number of steps available to control flow regardless of the valve configuration, the force/flow curve for the control channel will be approximately the same. The control system of the present invention thus normalizes the gain of the valve for the control channel. This can provide an advantage over prior art systems, because the control channel presents a more consistent and predictable gain than prior art system. Moreover, overall control response and stability can be achieved for a wider range of valve configurations.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A system of valve control comprising:
a processor;
a computer readable medium accessible by the processor;
a set of computer instructions stored on the computer readable medium, wherein the set of computer instructions comprise instructions executable to:
output a first signal on a first channel indicating an initial force to be applied to a valve; and
output a second signal on a second channel indicating a control force to be applied to the valve;
wherein the initial force is substantially equal to a valve threshold.

2. The system of claim 1, wherein the control force is at least a portion of a remainder force.

3. The system of claim 2, wherein the remainder force is equal to a total force minus the initial force.

4. The system of claim 1, wherein the first signal is a first pulse width modulated signal having a pulse width proportional to the initial force and wherein the second signal is a second pulse width modulated signal having a pulse width proportional to the control force.

5. The system of claim 4, further comprising:
a reference voltage source that produces a reference voltage;
a first open drain buffer connected to the reference voltage source and the processor, wherein the first open drain buffer receives the first signal and outputs a third signal having a first voltage proportional to the initial force; and
a second open drain buffer connected to the processor, wherein the second open drain buffer receives the second signal and outputs a fourth signal having a second voltage proportional to the control force.

6. The system of claim 5, further comprising a first summer, wherein the first summer subtracts the first voltage from the reference voltage to generate a fifth signal having a remainder voltage.

7. The system of claim 6, wherein the second open drain buffer is connected to a second summer and wherein the second open drain buffer generates the fourth signal based on the remainder voltage and the second signal.

8. The system of claim 6, further comprising:
a first low pass filter that filters the third signal; and
a second low pass filter that filters the fourth signal.

9. The system of claim 6, further comprising a second summer that adds the third signal and the fourth signal to generate a valve control signal.

10. The system of claim 9, further comprising an actuator control module connected to the second summer that translates the valve control signal into a valve force to be applied to the valve.

11. The system of claim 1, further comprising:
a first digital to analog converter connected to the processor that converts the first signal into a third signal having a first voltage proportional to the initial force; and
a second digital to analog converter connected to the processor that converts the second signal into a fourth signal that has a second voltage proportional to the control force.

12. The system of claim 11, further comprising a summer connected to the first digital to analog converter and the second digital to analog converter that adds the third signal and the forth signal to generate a valve control signal.

13. The system of claim 1, wherein the control force is indicated proportional to a remaining force.

14. The system of claim 1, wherein the computer instructions further comprise instructions executable to:
receive a set point signal;
output the first signal in response to the set point signal.

15. The system of claim 1, wherein the computer instructions further comprise instructions executable to:
receive a set point signal; and
generate the second signal based on the set point signal.

16. The system of claim 1, wherein the computer instructions further comprise instructions executable to change the first signal to indicate a new initial force.

17. The system of claim 16, wherein the system is a fluid control system further comprising a pressure sensor to measure pressure experienced by the fluid control system, wherein the processor monitors the pressure sensor, and wherein the computer instructions further comprise instructions executable to change the first signal in response to a change in pressure measured by the pressure sensor.

18. A method for valve control comprising:
outputting a first signal on a first control channel indicating an initial force to be applied to the valve;
outputting a second signal on a second control channel indicating a control force to be applied to the valve; and
generating a third signal from the first signal and the second signal, wherein the third signal indicates a valve force equal to a sum of the initial force and the control force;
wherein the initial force is substantially a valve threshold force.

19. The method of claim 18, further comprising indicating the initial force with a first pulse width modulated signal and indicating the control force with a second pulse width modulated signal.

20. The method of claim 18, further comprising:
indicating the initial force with a first voltage proportional to the initial force; and
indicating the control force with a second voltage proportional to the control force with respect to a remainder force.

21. The method of claim 20, wherein the remainder force is a total force minus the initial force.

22. The method of claim 18, further comprising changing the first signal to indicate a new initial force.

23. A method of controlling a valve, comprising:
generating a reference signal with a reference voltage proportional to a total force;
generating a first signal having a first voltage based on the reference voltage, wherein the first voltage is proportional to an initial force;
generating a second signal having a remainder voltage;
generating a second voltage based on the remainder voltage that is proportional to a control force; and
generating a valve control signal having a control voltage equal to a sum of the first voltage and the second voltage.

24. The method of claim 23, further comprising: converting the valve control voltage into an applied force.

25. The method of claim 23, further comprising changing the first voltage to indicate a new initial force.

26. A valve control system comprising:
a processor further comprising:
a threshold output; and
a control output;
a computer readable medium accessible by the processor;
a set of computer instructions stored on the computer readable medium, wherein the set of computer instructions comprise instructions executable to:
output a first pulse width modulated signal on the threshold output indicating an initial force to be applied to a valve by an actuator; and
output a second pulse width modulated signal on the control output indicating a control force to be applied to the valve;
a reference voltage source;
a first open drain buffer further comprising:
a reference voltage input connected to the reference voltage source;
a threshold input connected to the threshold output;
a first open drain buffer output;

a first low pass filter connected to the first open drain buffer output;
a first summer having first summer inputs connected to the first low pass filter and the reference voltage source;
a second open drain buffer further comprising:
   a remainder voltage input connected to the first summer output;
   a control input connected to the control output;
   a second open drain buffer output;
a second low pass filter connected to the second open drain buffer output, the second low pass filter having a second low pass filter output; and
a second summer connected to the second low pass filter output.

27. The control system of claim 26, further comprising a proportional actuator control module connected to an output of the second summer.

28. A method for controlling a valve comprising:
generating a first pulse width modulated signal, with a pulse width proportional to an initial force;
generating a second pulse width modulated signal, with a pulse width proportional to a control force;
converting the first pulse width modulated signal into a first direct current signal having a first voltage proportional to the initial force based on the first pulse width modulated signal and a reference voltage;
generating a remainder voltage;
converting the second pulse width modulated signal into a second direct current signal having a second voltage proportional to the control force based on the second pulse width modulated signal and the remainder voltage; and
summing the first direct current signal and the second direct current signal to generate a valve control signal.

29. A valve control system comprising:
a processor further comprising:
   a threshold output;
   and a control output;
a computer readable medium accessible by the processor;
a set of computer instructions stored on the computer readable medium, wherein the set of computer instructions comprise instructions executable to:
   output a first signal on the threshold output indicating an initial force to be applied to a valve by an actuator; and
   output a second signal on the control output indicating a control force to be applied to the valve;
a reference voltage source;
a first digital to analog converter connected to the threshold output and the reference voltage source;
a first summer connected to an output of the first digital to analog converter and the reference voltage source, wherein the first summer generates a remainder voltage;
a second digital to analog converter connected to the control output and the first summer and the threshold output; and
a second summer connected to outputs of the first digital to analog converter and the second digital to analog converter.

30. A method for controlling a valve comprising:
generating a digital signal indicating an initial force;
generating a second digital signal indicating a control force;
converting the first digital signal at first digital to analog converter into a first direct current signal having a first voltage proportional to the initial force based on the first digital signal and a reference voltage;
generating a remainder voltage;
converting the second digital signal at a second digital to analog converter into a second direct current signal having a second voltage proportional to the control force based on the second digital signal and the remainder voltage; and
summing the first direct current signal and the second direct current signal.

* * * * *